UNITED STATES PATENT OFFICE.

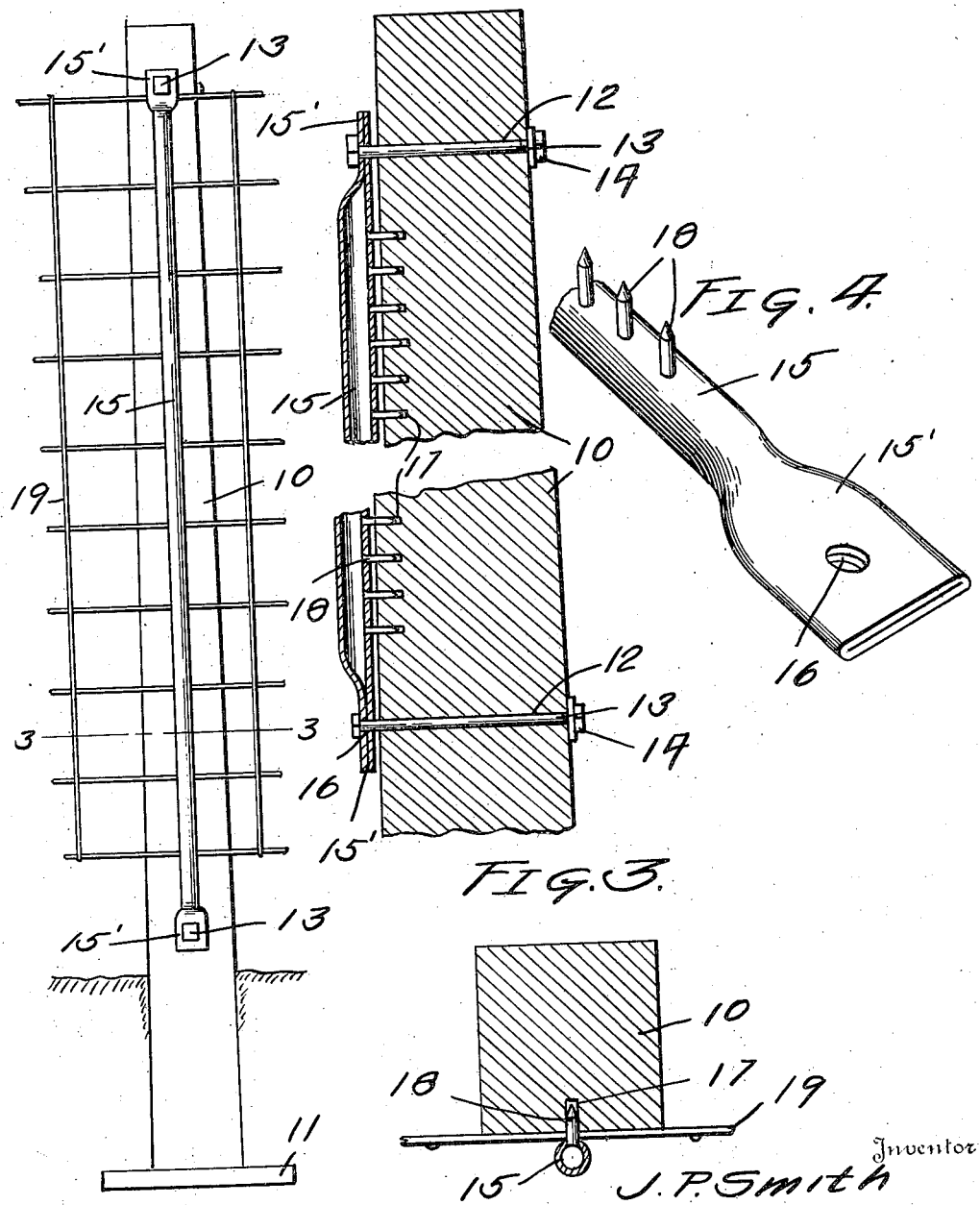

JAMES P. SMITH, OF BOONVILLE, INDIANA.

WIRE-CLAMP FOR FENCE-POSTS.

1,243,884.      Specification of Letters Patent.      Patented Oct. 23, 1917.

Application filed May 28, 1915. Serial No. 31,010.

*To all whom it may concern:*

Be it known that I, JAMES P. SMITH, a citizen of the United States, residing at Boonville, in the county of Warrick, State of Indiana, have invented certain new and useful Improvements in Wire-Clamps for Fence-Posts; and I do hereby declare the following to be a full, clear, and exact description of the invention, such as will enable others skilled in the art to which it appertains to make and use the same.

This invention relates to improvements in wire clamps for fence posts and has for an object the provision of a simple and novel device of this character by means of which wire fencing and the like may be quickly and easily secured to and removed from a fence post.

With the above and other objects of similar nature in view, the invention consists in the construction, combination and arrangement of parts, set forth in and falling within the scope of the appended claim.

In the drawing:

Figure 1 is a side elevation of a fence post with the invention applied thereto.

Fig. 2 is a vertical sectional view therethrough.

Fig. 3 is a transverse sectional view taken on the line 3—3 of Fig. 1, and

Fig. 4 is a fragmentary perspective view of the wire clamp removed from the post.

Referring now more particularly to the drawing, there is shown a fence post 10. This post is adapted to be embedded in the ground in the usual manner and is securely anchored in position by means of the base 11, employment of this base obviating the necessity for sinking the post deeply in the ground as is generally done.

Extending through the post adjacent its upper and lower ends are transverse openings 12 and removably engaged through said openings are bolts 13 provided with nuts 14 by which they are suitably secured.

Detachably engaged with the post and extending longitudinally of one face thereof is a clamping bar 15 formed preferably of a length of pipe flattened as at 15' at its ends, and having openings 16 therein loosely receiving the bolts 13. Formed on the inner face of the bar are a series of projections 18, said projections being tapered at their free ends and adapted to enter the face of the post to facilitate insertion within the recesses.

Thus in securing the fence 19 to the post the bar 15 is removed and the fence tightly stretched across the face of the post, the bar 15 being then replaced and the nuts 14 tightened upon the bolts to clamp the fence between the post and bar, the projections 18 entering the post with the line wires of the fence disposed between adjacent projections.

The fence is in this manner securely held in place, the positioning of the line wires between the projections obviating any tendency for vertical displacement of the fence, while should it be desired to remove the fence for any purpose, such may be readily accomplished by withdrawing the bolts 13 and detaching the bar.

What is claimed is:

As an article of manufacture, a wire clamping device formed from a single length of pipe with its ends flattened and apertured for the reception of attaching means, and a longitudinal series of spaced lateral projections fixedly secured at their inner ends in openings formed in the pipe.

In testimony whereof, I affix my signature, in the presence of two witnesses.

JAMES P. SMITH.

Witnesses:
   C. L. FLUHRER,
   MARSHALL R. TWEEDY.